United States Patent [19]

Takahashi

[11] 4,453,990
[45] Jun. 12, 1984

[54] METHOD AND APPARATUS FOR ATTACHING REINFORCING MATERIAL TO SLIDE FASTENER CHAIN

[75] Inventor: Kihei Takahashi, Toyama, Japan

[73] Assignee: Yoshida Kogyo K. K., Tokyo, Japan

[21] Appl. No.: 383,984

[22] Filed: Jun. 1, 1982

[30] Foreign Application Priority Data

Jun. 16, 1981 [JP] Japan .................................. 56-92444

[51] Int. Cl.³ ...................... B32B 31/10; A44B 19/24
[52] U.S. Cl. ....................................... 156/66; 29/33.2;
29/408; 156/160; 156/204; 156/216; 156/479;
156/494; 156/519
[58] Field of Search ................................ 29/408–410,
29/33.2; 156/66, 160, 494, 519, 204, 216, 479

[56] References Cited

U.S. PATENT DOCUMENTS 3,535,189 10/1970 Haze et al. ........................... 156/486
3,671,347 6/1972 Yoshieda .............................. 156/160

FOREIGN PATENT DOCUMENTS 17017 5/1972 Japan .

Primary Examiner—Robert A. Dawson
Attorney, Agent, or Firm—Hill, Van Santen, Steadman & Simpson

[57] ABSTRACT

A method and apparatus for attaching a reinforcing tape to an intermittent fastener chain. A fastener chain having alternate element-containing and element-free sections is advanced intermittently in the longitudinal direction thereof. When the fastener chain is stopped, a strip of reinforcing tape is moved transversely across an element-free section from the side edge thereof and is folded over the side edge, after which pressure is applied to the side edge from the top and bottom sides of the chain to adhere the strip of reinforcing tape to the side edge. The attachment of the tape is divided into a first attaching step of applying pressure solely to the vicinity of the side edge from both sides of the fastener chain, and a second attaching step of applying pressure to the entire portion of the element-free section having the strip of reinforcing tape folded thereon, from both sides of the fastener chain.

2 Claims, 11 Drawing Figures

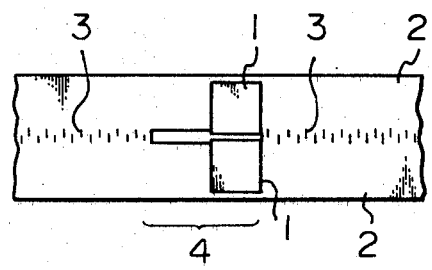
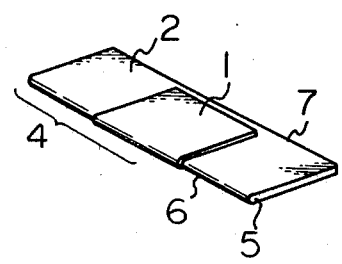
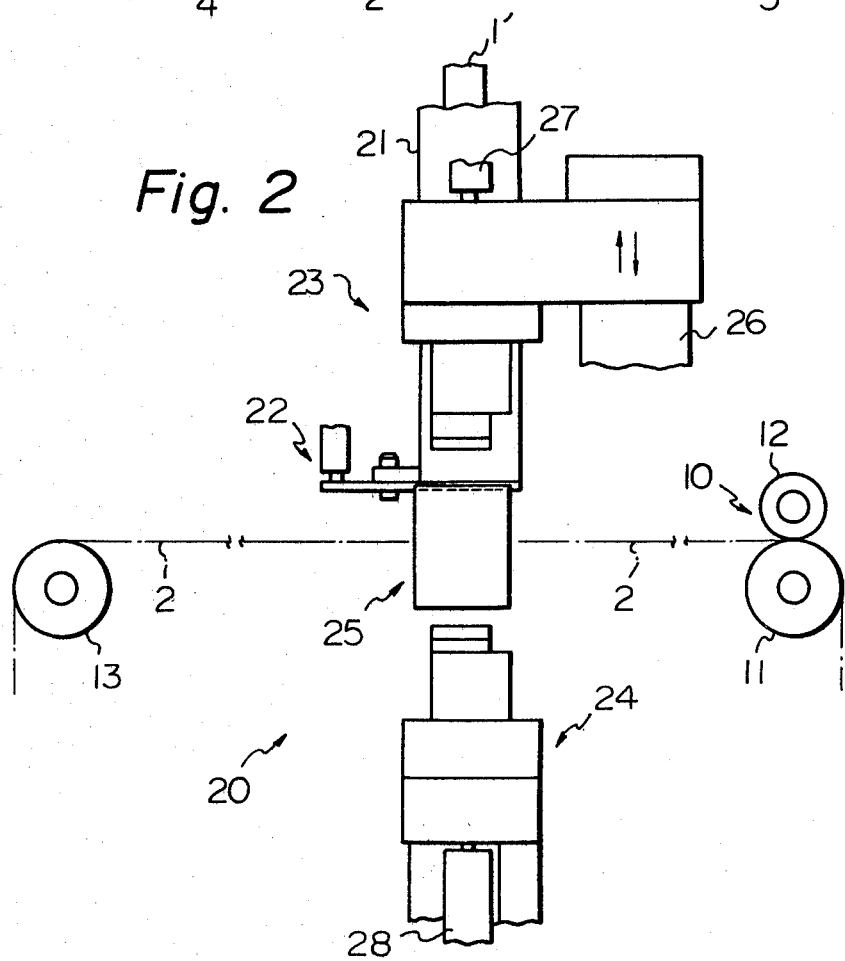

METHOD AND APPARATUS FOR ATTACHING REINFORCING MATERIAL TO SLIDE FASTENER CHAIN

BACKGROUND OF THE INVENTION

1. Field of the Invention:

This invention relates to a method and apparatus for attaching a strip of reinforcing tape, consisting essentially of a synthetic resin, onto a slide fastener chain, particularly at the portion of the fastener where a pin member and pin-receiving box member are provided on the opposed stringer tapes.

A fastener chain consists of a pair of continuous length stringers each having alternate fastening element-containing and element-free sections. The so-called intermittent fastener chain of this type, after being cut off at the section devoid of the fastening elements to form an individual fastener, has a pin member attached to one stringer and a pin-receiving box member attached to the other opposing stringer, these being provided at the sections devoid of the fastening elements, known as "space" portions in the art. The opposed stringer tapes are joined by inserting the pin member into the box member. When the pin and box members are attached to the fastener chain directly, the fastener chain does not possess sufficient durability owing to damage incurred by frictional contact with these elements during use. Accordingly, it is conventional practice to attached reinforcing strips of synthetic resin to the fastener chain at the portions where the pin and box members are to be affixed, prior to affixing these members. The present invention relates to a method and apparatus for automatically attaching these reinforcing strips to the intermittent fastener chain at the space portions thereof in successive fashion before the fastener chain is cut off to form individual fasteners.

2. Description of the Prior Art:

A method and apparatus for the foregoing purpose have already been disclosed in Japanese Patent Publication No. 17017/1972 or U.S. Pat. No. 3,671,347 and, to the Applicant's knowledge, represent the highest level in the art. Nevertheless, the invention disclosed in the above publication does possess several disadvantages. Specifically, in folding a strip of reinforcing tape around one edge of the fastener, the particular arrangement of the apparatus is such that the strip of reinforcing tape protrudes a certain distance beyond the opposite edge of the fastener once it has been attached thereto. This protruding length of tape represents wasted material since it does not contribute to reinforcement of the fastener. Furthermore, despite the fact that one edge of the fastener usually includes an embedded woven yarn which makes that edge thicker than the remaining portion of the fastener, which is flat, the entire reinforcing tape is pressed adhesively onto thickened and flat portions of the fastener at the same time. This not only causes wrinkling and the formation of air bubbles between the reinforcing tape and fastener, which can in turn cause the reinforcing tape to peel off, but also affects the positional accuracy with which the reinforcing tape is attached.

SUMMARY OF THE INVENTION

Accordingly, the object of the present invention is to eliminate the foregoing disadvantages encountered in the known method and apparatus.

A more specific object of the present invention is to provide a method of attaching strips of reinforcing tapes of the minimum required length onto the space portions of an intermittent fastener chain with great accuracy and at a high production rate.

It is another specific object of the present invention to provide an apparatus for practicing said method in an automatic mode of operation.

These and other objects and features of the invention will be apparent from the detailed description which follows in connection with the accompanying drawings illustrating a preferred embodiment, in which like reference numerals refer to like parts throughout the several views.

BRIEF DESCRIPTION OF THE DRAWINGS

FIG. 1a is a plan view of a pair of interlocking intermittent fastener chains each of which is provided with a strip of reinforcing tape;

FIG. 1b is a perspective view of a portion of an intermittent fastener chain provided with the strip of reinforcing tape, in which the fastening elements are not shown;

FIG. 2 is a side view showing the positional relationship of various parts of an apparatus embodying the present invention;

DESCRIPTION OF THE PREFERRED EMBODIMENT

Figure 3:
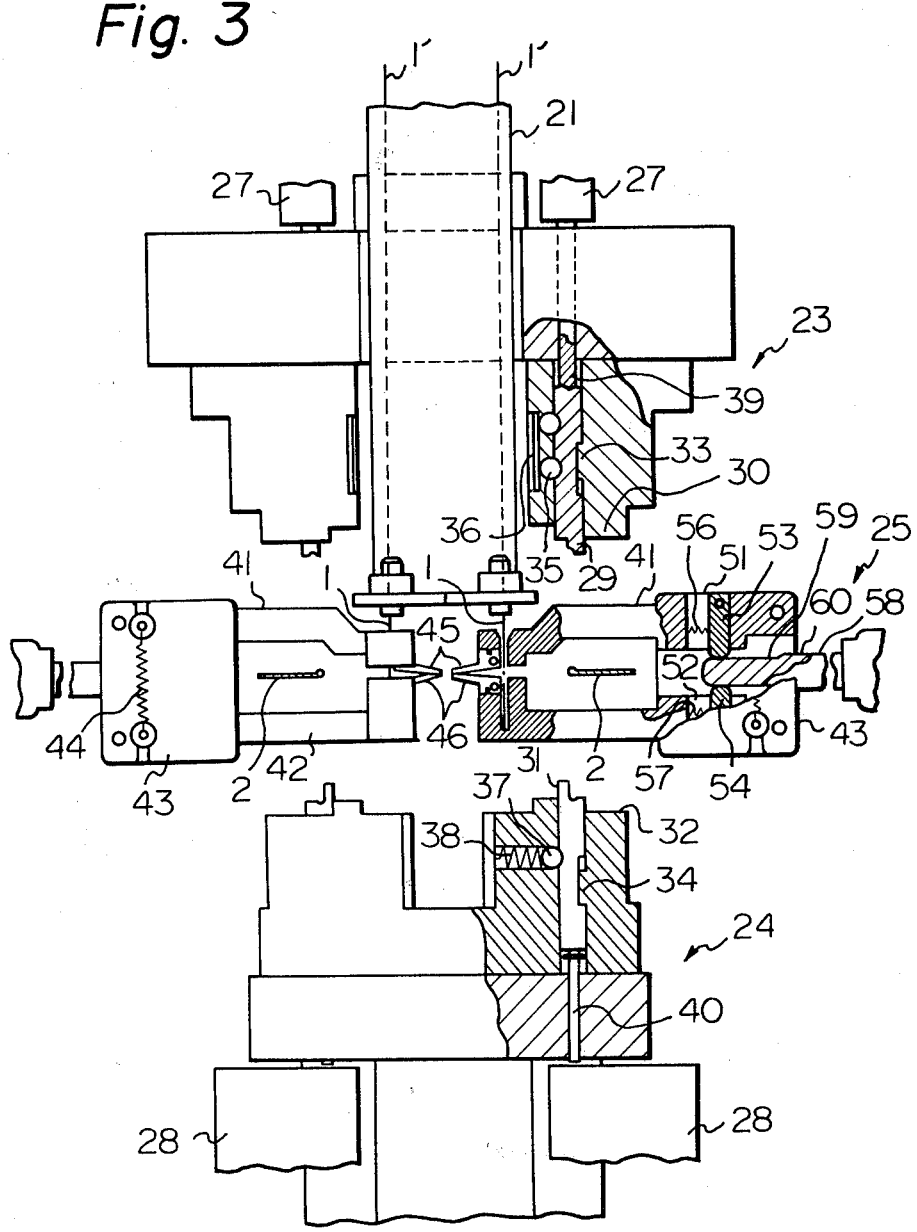
FIG. 3 is a detailed front view, partly sectional, of a reinforcing tape attaching station forming one important aspect of this embodiment of the invention.

As shown in FIG. 1a, a pair of intermittent fastener chains 2 carry rows of interlocking fastening elements 3 alternating with space portions, one of which is designated at numeral 4. A strip of reinforcing tape 1 is attached to each stringer tape of the fastener in a manner to be described below. The reforcing tape 1 is offset to one side of the space portion 4 and is folded around one edge of the fastener chain 2 and bonded to both sides thereof.

FIG. 1b shows one of the fastener chains 2 with the reinforcing tape 1 attached to the space portion 4 thereof, the fastening elements 3 adjoining the space portion being deleted from the drawing. A reinforcing yarn 5 is shown embedded in the edge 6 of the fastener chain that carries the fastening elements. As a result, the edge 6 is thicker than the opposite edge 7 of the fastener chain. Although the reinforcing tape 1 is attached to both sides of the fastener chain 2 by folding it around the thickened edge 6 as in the prior art, in accordance with the present invention the ends of the reinforcing tape 1 do not extend beyond the edge 7 of the fastener chain 2 but stop short of said edge 7. More specifically, in the arrangement disclosed in Japanese Patent Publication No. 17017/1972 or U.S. Pat. No. 3,671,347, the ends of the reinforcing tape inevitably protrude from the opposite edge of the fastener chain, so that a large quantity of tape is wasted. Moreover, since the reinforcing tape applied across the fastener chain at an incline from the thickened edge to the opposite edge is attached to the fastener chain by the single pressing action of only one set of press means, the reinforcing tape develops wrinkles and air bubbles become entrapped between the reinforcing tape and fastener chain. For these reasons the possibility of producing rejects is comparatively high.

The present invention succeeds in eliminating these disadvantages by attaching the reinforcing tape in two pressing steps executed by first and second press means.

Referring now to FIG. 2 which shows an apparatus embodying the present invention, the fastener chain 2 is advanced by an intermittent advancing mechanism 10 which operates automatically. The advancing mechanism 10 may comprise a feed roller 11, a pressure roller 12 engaged with the feed roller 11 to feed the fastener chain 2, a guide roller 13, as well as a drive mechanism and space portion sensing means, not shown. A reinforcing tape attaching station, indicated generally at 20, comprises a conveying device 21 for conveying the as yet uncut stock 1' of reinforcing tape 1, a reinforcing tape cutting device 22 which cuts the tape stock 1' into strips of reinforcing tape 1 of a predetermined length, upper and lower pressing devices 23, 24 reciprocable vertically and adapted to apply and attach the strips of reinforcing tape 1 onto the fastener chain 2, and a holding device 25 for holding the strips of reinforcing tape. A guide column 26 is provided for guiding the pressing devices 23, 24 up and down. Stoppers are indicated at 27 and 28.

The reinforcing tape attaching station 20 is shown in greater detail in FIG. 3. The embodiment presently illustrated is designed for applying two strips of reinforcing tape at a time onto a pair of fastener chains 2, 2. It should be noted, however, that the invention may be applied to a single chain fastener with similar results.

Referring to FIG. 3, the upper and lower pressing devices 23, 24 are guided vertically on the column 26 and are capable of being reciprocated synchronously in mutually opposing directions. The upper pressing device 23 includes a punch 29 configured to correspond to the reinforcing yarn 5 embedded in the edge of the fastener chain, and a punch 30 which is configured to correspond to the flat portion of the fastener chain. The lower pressing device 24 includes a die 31 and a die 32 which also are configured to correspond to the reinforcing yarn 5 and flat portion of the fastener chain, respectively. The punch 29 and die 31 operate coactively and constitute first press means. Similarly, the punch 30 and die 32 operate coactively and constitute second press means. The punch 29 is provided within a bore extending through the punch 30 and is capable of being moved vertically a specified distance within the bore relative to the punch 30. Likewise, the die 31 is provided within a bore extending through the die 33 and is capable of being moved vertically a specified distance within the bore relative to the die 33. The vertical distances over which the punch 29 and die 31 are capable of travelling are regulated by projections 33, 34 formed on the walls of the bores in the punch 30 and die 32, respectively, the projections 33, 34 fitting in respective recesses formed in the punch 29 and die 31. When not employed in a pressing operation the punch 29 and die 31 are retained at predetermined positions by click stop mechanisms which comprise a ball 35 and leaf-spring 36 for retaining the punch 29, and a ball 37 and spring 38 for retaining the die 31. Pins 39, 40 are affixed to the punch 29 and die 31, respectively, and are adapted to strike the respective stoppers 27, 28, whereby punch 30 and die 32 are permitted to move relative to punch 29 and die 31, respectively.

Figure 4:
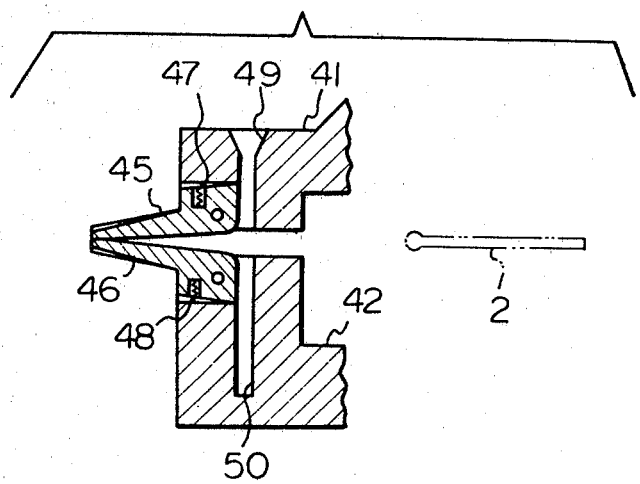
FIG. 4 is a sectional view showing the ends of jaws which constitute part of the reinforcing tape attaching station.
Figure 5:
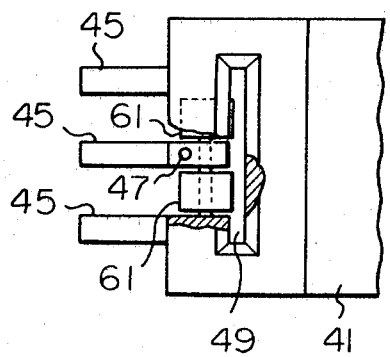
FIG. 5 is a plan view, partially broken away, illustrating the ends of the jaws shown in FIG. 4.
Figure 6:
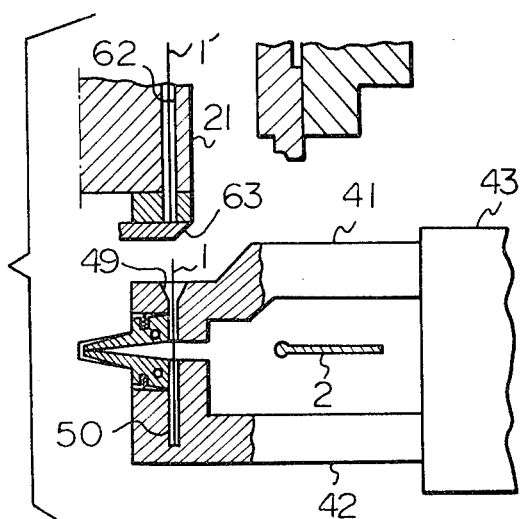
FIGS. 6 through 10 are illustrative views useful in describing how a reinforcing tape is positioned, folded and pressed onto a fastener chain according to the method of the present invention.

Reference will now be had to FIGS. 3, 4 and 5 to describe the construction of the reinforcing tape holder 25. The holder 25 includes upper and lower jaws 41, 42 each having one end pivotally connected to the holder body 43. The other or free ends of the jaws 41, 42 are normally biased closed by means of a spring 44 provided on the holder body 43. Lip members 45, 46 are pivotally connected to the free ends of jaws 41, 42, respectively, and are normally biased closed by leaf springs 47, 48, best shown in FIG. 4. A vertical slit 49 for supporting the reinforcing tape 1 is formed through the upper jaw 41 close to the base of the lip member 45. A vertical slit 50, aligned with the slit 49, is formed in the lower jaw 42 near the base of the lip member 46 also for the purpose of supporting the reinforcing tape 1. The slit 50 does not pass through the jaw 42 and therefore has a bottom. The upper and lower jaws 41, 42 are provided with vertical through-holes 51, 52 near the base thereof. The through-holes 51, 52 accommodate opposed fingers 53, 54 which oppose each other within the recess formed between the jaws 41, 42, and which are pivotally connected at one end to the respective jaws. The fingers 53, 54 are normally urged into abutting contact with the back walls of the through-holes 51, 52 by means of respective springs 57, 56 disposed therein. A horizontally movable cam member 58 is provided for engagement with the fingers 53, 54 and has a first land 59 and a second land 60 which is higher than the first. The holder body 43 is capable of being reciprocated horizontally together with the upper and lower jaws 41, 42 by a drive mechanism, not shown. The cam member 58 also is horizontally reciprocable. When the jaws 41, 42 are to be closed the cam member 58 is moved to a position where the first land 59 engages with the fingers 53, 54; to open the jaws, the cam member 58 is moved to bring the second land 60 into engagement with the fingers 53, 54. As shown in FIG. 5, which is a plan view illustrating the ends of the jaws 41, 42, three of the upper and lower lip members 45, 46 are provided in this embodiment. Separating rollers 61, serving also as guide rollers for the reinforcing tape 1, are disposed between the adjacent lip members 45 or 46. It should be noted, however, that only one upper and lower lip member need be provided, in which case it is possible to dispense with the separating rollers 61.

The operation of the invention will now be described, with particular reference to FIGS. 6 through 10.

Before the reinforcing tape 1 can be attached to the fastener chain 2, the chain is stopped, tensioned and held at a predetermined position in the attaching station 20 where its space portion, or element-free section, is set for receiving the tape. This is the condition illustrated in FIG. 6. After the step of holding the fastener chain 2 at the predetermined position, for simultaneously therewith, the holder body 43 is moved horizontally to so position the jaws 41, 42 that the slits 49, 50 are brought below and registered with a tape supply channel 62 provided in the reinforcing tape conveying device 21. The reinforcing tape stock 1' is threaded through the supply channel 62 to reach the registered slits 49, 50 which position the tape while a cutter 63 provided on the cutting device 22 (FIG. 2) cuts the tape into a strip of a predetermined length, which length is so set that the strip of tape to be attached to the fastener chain will not project beyond the thin edge of the fastener chain.

Figure 7:
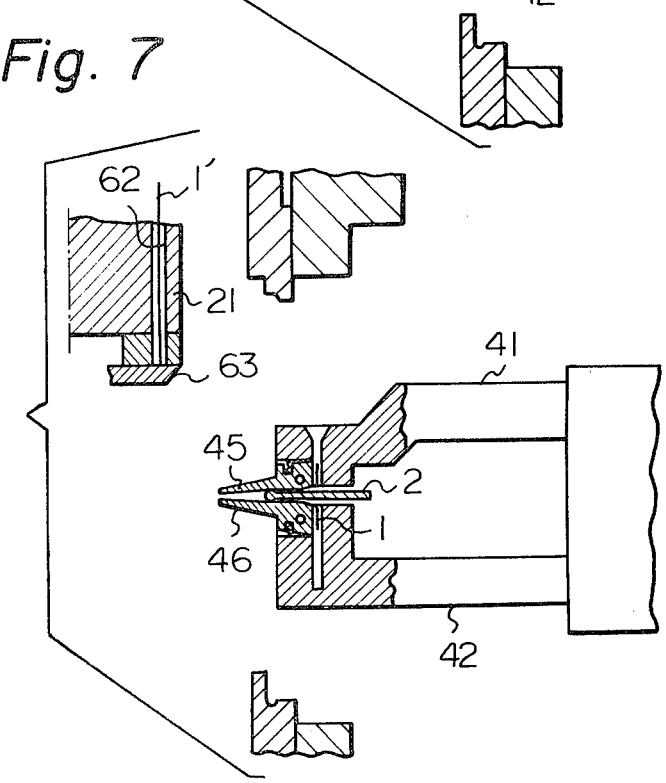

The strip of reinforcing tape 1, after having been positioned in the slits 49, 50, is folded around one edge of the fastener chain 2, as illustrated in FIG. 7. This is accomplished by moving the jaws 41, 42, which are still closed, to the right in FIG. 6, whereby the space portion 4 of the fastener chain 2 held at the predetermined position enters between the lip members 45, 46 while the strip of reinforcing tape 1 is folded around the edge of the fastener chain 2, having the embedded reinforcing yarn 5, by means of the lips 45, 46.

Figure 8:
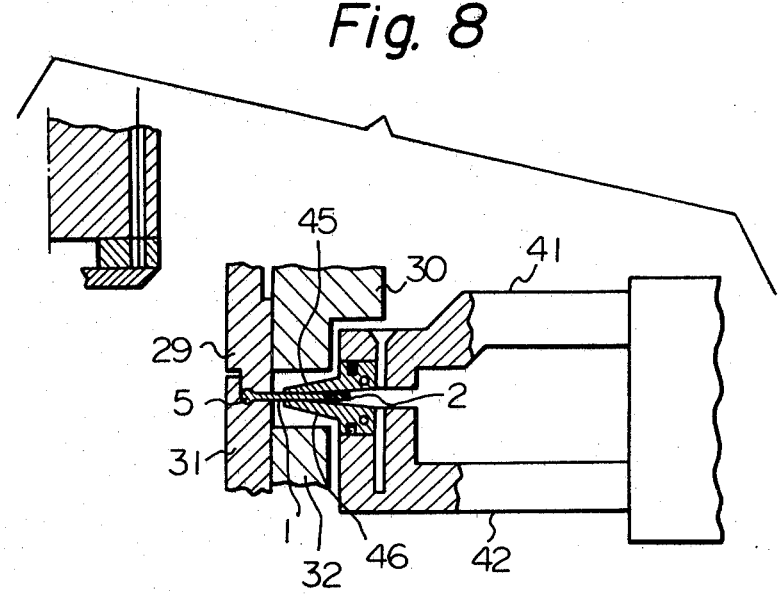
Figure 9:
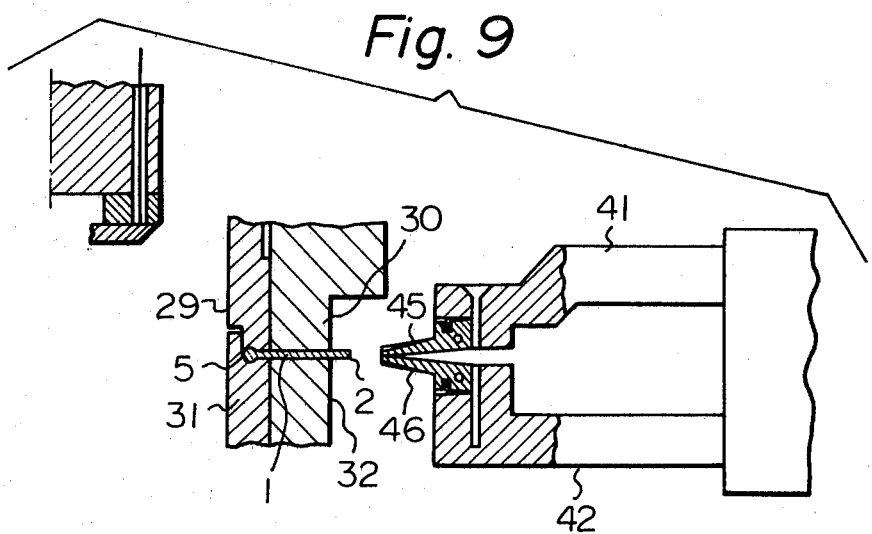

Next, a first attaching step is carried out as shown in FIG. 8. Here the coacting punch 29 and die 31 constituting the first press means are moved toward each other to adhesively press the central portion of the reinforcing tape 1 into position on both sides of the thickened edge of the fastener chain space portion, said edge having the embedded reinforcing yarn. At this time the lip members 45, 46 retain the strip of reinforcing tape 1 only lightly at the position corresponding to the flat portion of the fastener chain 2, so that the strip of reinforcing tape 1 may slide freely in the horizontal direction across the width of the fastener chain owing to the pressure exerted upon the tape at the curved portion corresponding to the embedded yarn. This eliminates wrinkling and creasing of the reinforcing tape. If the fastener chain is an ordinary fabric and the reinforcing tape consists of a common synthetic resin, the tape can be attached to the fastener chain sufficiently by applying suitable pressure, without requiring the use of an adhesive. It is possible, however, to employ a thermoplastic resin as the reinforcing tape and to attach the tape by the simultaneous application of heat and pressure.

A second attaching step, following the first attaching step described above, is carried out as illustrated in FIG. 9. The lip members 45, 46 are moved to the right of the position shown in FIG. 8 to completely disengage from the fastener chain 2. Next, the coacting punch 30 and die 32 constituting the second press means are moved toward each other to adhesively press the remaining portion of the reinforcing tape 1 into position on both sides of the flat portion of the fastener chain 2. The first press means, meanwhile, comprising the punch 29 and die 31, continues to press the reinforcing tape 1 on the thickened edge portion of the fastener chain 2. At the end of this step, therefore, both the first and second press means cooperate in adhesively pressing the strip of reinforcing tape 1 into position on both sides of the fastener chain, whereby the tape is strongly secured to the fastener chain.

Figure 10:
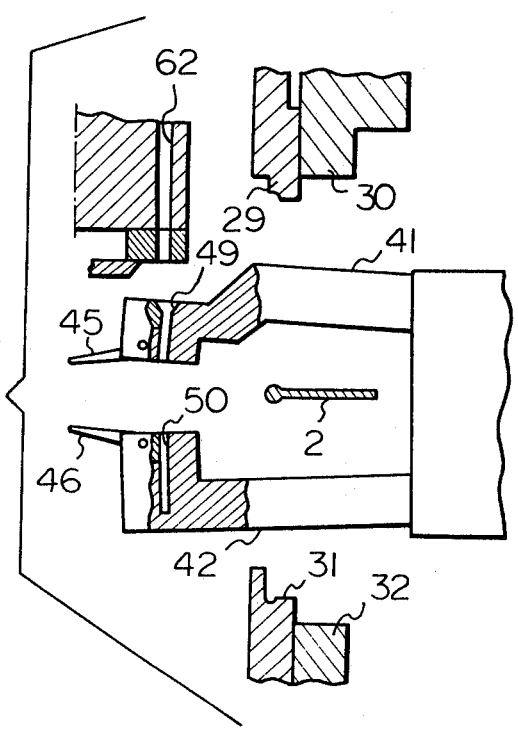

The final step, which will be described with reference to FIG. 10, is to retract the punches and dies constituting the first and second press means, and to restore the apparatus to its original condition to prepare for the next cycle. In the punch and die retraction operation, the punch 29 and die 31 of the first press means initially are retracted in unison with the punch 30 and die 32 of the second press means, but come to a stop prior to the punch 30 and die 32 because the pins 39, 40 affixed thereto abut against the stoppers 27, 28, respectively. This restores the punches and dies to the condition shown in FIG. 6. During the punch and die retraction operation the cam member 58 is moved to the left to bring the second land 60 into engagement with the fingers 53, 54, whereby the free ends of the pivoted jaws 41, 42 open and draw apart, carrying the lip members 45, 46 with them. Under these conditions the jaws 41, 42 are moved to the left until the slits 49, 50 are in registration with the reinforcing tape supply channel 62, with the fastener chain 2 passing between the opened jaws 41, 42. This is the condition depicted in FIG. 10. Thereafter the cam member 58 is moved to the right to bring the first land 59 into abutting contact with fingers 53, 54, thereby closing the jaws 41, 42 so that the apparatus is restored to the condition shown in FIGS. 3 and 6. In coordination with this step the fastener chain 2 is advanced to set the next space portion thereof at the predetermined position between the jaws 41, 42 to prepare for the next cycle.

The method of the present invention is characterized by repeating the foregoing steps automatically, and the illustrated embodiment is but one example of an apparatus suitable for practicing the method efficiently. Accordingly, many apparently widely different embodiments of the present invention can be made without departing from the spirit and scope thereof, and it is to be understood that the invention is not limited to the specific embodiments thereof but only by the appended claims.

What is claimed is:

1. A method of attaching a strip of reinforcing tape to a slide fastener chain having alternate element-containing and element-free sections along one thickened, reinforced side edge, wherein the fastener element chain is advanced intermittently in the longitudinal direction thereof and stopped each time an element-free section thereof arrives at a reinforcing tape attaching station, said method comprising the steps of (a) through (e) executed while said fastener chain is stopped:
  (a) maintaining the fastener chain in a state where the chain in tensioned longitudinally, with an element-free section thereof being located at a predetermined position within said reinforcing tape attaching station;
  (b) positioning a strip of reinforcing tape, obtained by cutting a reinforcing tape to a predetermined length, at a predetermined position in such a manner that the center line of the strip of reinforcing tape lies parallel to the thickened side edge of said element-free section and the surface of the strip lies at a right angle to the opposed surfaces of said element-free section;
  (c) moving the strip of reinforcing tape, located at said predetermined position, transversely across said fastener chain from said thickened side edge of the element-free section to fold over said strip onto both surfaces of said element-free section;
  (d) attaching the strip of reinforcing tape solely to the vicinity of said thickened side edge of the element-free section by applying pressure to the vicinity of said thickened side edge over which said strip is folded; and
  (e) subsequently attaching the remainder of the strip of reinforcing tape to the opposed surfaces of the element-free section neighboring said thickened side edge which bears said strip attached in step (d) by applying pressure to both said opposed surfaces while retaining the pressure applied in step (d) to prevent deformations in the strip of reinforcing tape.

2. In an apparatus for attaching a strip of reinforcing tape to a slide fastener chain having alternate element-containing and element-free sections along one thickened, reinforced said edge, which apparatus includes a reinforcing tape attaching station and an automatically operable intermittent advancing mechanism for advancing the fastener chain intermittently in such a manner that the fastener chain is stopped for a predetermined period of time whenever an element-free section thereof arrives at said reinforcing tape attaching section, an improvement wherein reinforcing tape attaching station comprises:

means for clamping the element-free section at both ends thereof when the fastener chain is stopped and maintaining said element-free section under a tensioned state at a predetermined position for a predetermined period of time;

reinforcing tape holding means for moving a strip of the reinforcing tape, cut to a predetermined length, transversely across said fastener chain from the thickened side edge of the element-free section while the surface of said strip of reinforcing tape is held at a right angle to the opposed surfaces of said element-free section, and gradually transferring said strip of reinforcing tape, as a central portion thereof crosses the fastener chain thickened side edge, onto said fastener chain so as to be folded onto both opposed surfaces of said element-free section, said holding means being restored to its original position following said transfer without contacting the fastener chain;

first press made for pressing solely the central portion of the strip of reinforcing tape adhesively onto the fastener chain from both sides thereof when said reinforcing tape holding means has transferred part of said strip of reinforcing tape onto the fastener chain and maintaining pressure on the central portion of the strip for a holding period;

second press means for pressing the unattached remainder portion of said strip of reinforcing tape adhesively onto said fastener chain from both sides thereof after said reinforcing tape holding means has completely transferred said strip of reinforcing tape onto said fastener chain and during said holding period; and means for restoring said first and second press means to their original positions before said reinforcing tape holding means is restored to its original position.

* * * * *